US012743063B2

(12) United States Patent
Muehlenhoff

(10) Patent No.: US 12,743,063 B2
(45) Date of Patent: Sep. 22, 2026

(54) METHOD AND SIMULATOR FOR TESTING AT LEAST ONE CONTROLLER

(71) Applicant: dSPACE GmbH, Paderborn (DE)

(72) Inventor: Christoph Muehlenhoff, Bad Driburg (DE)

(73) Assignee: dSpace GmbH, Paderborn (DE)

(*) Notice: Subject to any disclaimer, the term of this patent is extended or adjusted under 35 U.S.C. 154(b) by 343 days.

(21) Appl. No.: 18/621,318

(22) Filed: Mar. 29, 2024

(65) Prior Publication Data

US 2024/0241491 A1 Jul. 18, 2024

Related U.S. Application Data

(63) Continuation of application No. PCT/EP2022/076973, filed on Sep. 28, 2022.

(30) Foreign Application Priority Data

Sep. 30, 2021 (DE) ..................... 10 2021 125 399.3

(51) Int. Cl.
*G05B 15/02* (2006.01)
*H04L 67/125* (2022.01)
*H04W 4/40* (2018.01)

(52) U.S. Cl.
CPC .................................... *G05B 15/02* (2013.01)

(58) Field of Classification Search
CPC .......... G05B 15/02; G05B 2219/23446; G05B 17/02; H04W 4/40; H04L 67/125
USPC ............................................................ 700/79
See application file for complete search history.

(56) References Cited

U.S. PATENT DOCUMENTS

| | | | | |
|---|---|---|---|---|
| 9,292,397 | B1 * | 3/2016 | Kleyman | G06F 11/2221 |
| 11,829,129 | B2 | 11/2023 | Gries | |
| 12,494,095 | B2 | 12/2025 | Chau et al. | |
| 2017/0220712 | A1 * | 8/2017 | Blesken | G06F 30/18 |
| 2021/0373545 | A1 * | 12/2021 | Mueller | G05B 17/02 |

FOREIGN PATENT DOCUMENTS

| | | | |
|---|---|---|---|
| DE | 102020104059 | A1 | 8/2021 |
| DE | 102020107141 | A1 | 9/2021 |
| DE | 102020134185 | A1 | 6/2022 |
| WO | WO2020165067 | A1 | 8/2020 |

OTHER PUBLICATIONS

International Search Report dated Jan. 23, 2023 in corresponding application PCT/EP2022/076973.
DSPACE: "What are Virtual ECUs" Aug. 22, 2018.
DSPACE: "Autera—Shaping the Autonomous Era" Oct. 2019.

* cited by examiner

*Primary Examiner* — Michael J Brown
(74) *Attorney, Agent, or Firm* — Muncy, Geissler, Olds & Lowe, P.C.

(57) ABSTRACT

A method for testing at least one control unit. At least two separate networks are provided on a simulator, wherein the control unit under test is connected to the simulator via a first network and a first control unit interface. The control unit under test is intended to communicate with at least one further control unit. The communication of the first further control unit is at least partly in the form of recorded messages. A playback unit for playing back the recorded messages is connected via at least one playback interface to the second network or a third network on the simulator. The playback unit is connected to the simulator via the playback interface.

13 Claims, 4 Drawing Sheets

METHOD AND SIMULATOR FOR TESTING AT LEAST ONE CONTROLLER

This nonprovisional application is a continuation of International Application PCT/EP2022/076973, which was filed on Sep. 28, 2022, and which claims priority to German Patent Application No. 10 2021 125 399.3, which was filed in Germany on Sep. 30,2021, and which are both herein incorporated by reference.

BACKGROUND OF THE INVENTION

Field of the Invention

The invention relates to a method for testing at least one control unit, wherein on a simulator, in particular on a hardware-in-the-loop (HIL) system with at least one computing unit, preferably a real-time computing unit, or on a software-in-the-loop (SIL) simulation platform, at least two separate networks are provided, wherein the control unit under test is connected to the simulator via an initial network and an initial control unit interface, e.g., an ethernet interface, or in which the simulator is emulated as a participant in the first network. In the latter case, the control unit under test is a so-called virtual control unit. The invention also relates to a simulator for carrying out the method according to the invention.

Description of the Background Art

A virtual control unit may be a purely software-based control unit that already has the serial code for the real control unit and of which there are different expansion levels (https://www.dspace.com/de/gmb/home/news/engineers-insights/blog-virtuals-ecus-1808.cfm#175_43575), which is attached hereto as Appendix-I, and incorporated herein by reference. In this document, the term "control unit" refers to both real and virtual control units, unless an explicit distinction is made. With reference to virtual control units, the term "emulating" can be generally used instead of "simulating" in order to differentiate the simulation of the virtual control units from the simulation of the pure communication components of control units, which is also described. In this document, "simulated control units" may only be software modules that simulate only the communication components of control units.

A control unit under test can be designed to communicate with at least one first further control unit, wherein the communication of the first further control unit is at least partly in the form of recorded messages, wherein via at least one playback interface (e.g., a further Ethernet interface) a playback unit for playing back the recorded messages is connected to the second network or a third network on the simulator, wherein the playback unit is connected to the simulator, for example, as a separate device—for example in the form of a suitable computer with a program for the playback of recorded messages, such as the RTMaps™ program from Intempora—via the playback interface. However, it can also be an internal playback unit for executing the program for the playback of recorded messages and an internal playback interface in the simulator or a software-trained interface between the playback unit and the simulator or the simulation platform. A queue is stored on the simulator for messages received in the second and/or third network and at least parts of the communication of the control unit under test with at least the first further control unit are simulated via a simulation model stored on the simulator and executed on the at least one computing unit of the simulator, wherein in the second network, at least parts of the communication of the control unit under test are simulated via a first software module of the simulation model, and wherein, on the simulator in the first network, the further control units communicating with the control unit under test are simulated as communications partners for the control unit under test via at least one further software module of the simulation model.

A similar method for testing control units via a simulator is described in the German patent publication number 102020134185, which is incorporated herein by reference, and wherein an HIL simulator is connected between the control unit under test and further control units, and the HIL simulator forwards the messages it receives from the further control units to the control unit under test. There, too, separate networks are provided on the HIL simulator, wherein the communication of the communication partners connected to the further network is simulated for each of the connected control units of one network.

A playback unit for storing and playing back recorded messages, for example, is described in W02020165067. The playback unit may be, for example, a device for recording and playing back messages in a vehicle network, such as that offered by dSPACE GmbH, https://www.dspace.com/de/gmb/home/products/hw/autera.cfm), which is attached hereto as Appendix-II, and incorporated herein by reference. However, a playback unit can also be integrated in a simulator.

SUMMARY OF THE INVENTION

It is therefore an object of the invention to further develop the conventional art.

In an example, the object is achieved in that the playback of the recorded messages transmitted from the playback unit via the playback interface to the simulator (e.g., also via the internal playback interface in the simulator to the computing unit of the simulator) via a playback code stored on the simulator, wherein a command to start playback causes the recorded messages that the simulator receives from the playback unit to be added to the queue and written from there to a message buffer in order to be forwarded to the control unit under test on a trigger command from the simulation model. The term "simulation model" can refer to the program executed on the simulator that simulates the timings, messages, signals and/or events or their transmission required for the testing of the control unit under test.

The advantage of the inventive solution is that the messages from the playback unit in the simulator (preferably given by a HIL simulator or a suitable PC or a PC or cloud-based SIL-simulation platform such as VEOS® from dSPACE) can be received in a separate network, namely the second or third network, which is separate from the first network to which the control unit under test is connected. In this context, the term "network" can refer to the fact that the communication participants (real, virtual and control units simulated only in communication components) stored in the respective network each have a unique identifier (ID) and are basically only directly connected to the participants of their network or can only send messages directly to them. The networks can be real networks or virtual networks with virtual interfaces.

In the first network, parts of the communication of the further control units are simulated, in particular expected messages are created for the control unit under test. The content of such a message or the message itself is then taken from the message buffer and, if necessary, the message and/or its content are manipulated before being forwarded to the control unit under test. The separation of the input and output network allows for such manipulation of the messages in the message buffer before sending. To send, the messages are transmitted to a sending queue or a sending buffer for the first control unit interface, and from there via the first control unit interface to the control unit under test.

The messages recorded in a vehicle may contain timestamps and backups (e.g., a so-called Message Authentication Code (MAC)) and/or be encrypted. Due to the checking of the time information and the backup, which are usually implemented in control units, the control unit under test, if purely forwarding recorded messages, would immediately notice that a message is not up-to-date and discard it. If a message is encrypted, the data would not be readable at all if the encryption depends on a current timestamp.

The use of separate networks according to the invention makes it possible to first properly receive a recorded message sent by the playback unit by the first software module in the second network. All backups are checked and all decryptions are carried out properly if the simulated control unit under test (i.e., the first software module) has the correct key material. The message contents are then readable, can be processed and also modified (e.g., a timestamp can be updated) and are thus forwarded to the first network. There, the further software module backs up and encrypts the manipulated data/messages again and then sends them to the control unit under test. Since in this case backups and encryptions take place with the original keys, the control unit under test cannot detect the manipulation and processes the received messages as if they had come from a real control unit.

The setup with separate networks makes it possible in an example for at least one further control unit interface to be available on the simulator, with which the first further control unit and/or a second further real or virtual control unit is connected to the second network, either in real or virtual form, wherein in the second network the control unit under test is simulated as a communication partner via another software module of the simulation model at least for the first further control unit, wherein messages from the first and/or the second further control unit coming in via the further control unit interfaces are added to the queue and written from there to the message buffer.

Thus, it is preferable to use a single queue on the simulator for all messages that are received on the second and/or third network (an input network), i.e. for all messages, regardless of whether they are recorded messages from the playback unit or current messages from a real or virtually connected control unit.

The separate networks are also particularly advantageous in this case, as they allow for a control unit simulated by a software module to have the same IP address on one network as the real or virtual control unit on the other network. The simulator is thus completely transparent to the real and virtual control units, i.e., the real and emulated control units appear to be communicating directly with each other. Thus, messages can be manipulated "unnoticed" for testing purposes.

Another advantage of connecting real control units to the simulator and/or emulating other virtual control units in the simulator and being able to involve real control units in the simulation is due to the fact that the control units can already be tested in the network. This situation is usually the case with an HIL or SIL simulator, but in combination with the inventive playback unit on the simulator it is possible to replace parts of the communication of the real or virtual control unit with recorded messages and vice versa.

The messages can have an identifier, wherein the message buffer on the simulator is set up in such a way that a dedicated message buffer is created for at least one predetermined message identifier, wherein each of the dedicated message buffers is set up to hold a certain number of messages with the appropriate identifier.

The messages can be, for example, messages from an automotive system, such as CAN, Flexray or Ethernet messages. For example, the messages consist of an Ethernet frame and the recorded messages still have a timestamp assigned by the playback unit or when received on the simulator, which is then removed before playback to the control unit under test. This timestamp assigned by the simulator or playback unit refers to a timestamp that is attached to the received messages in addition to any timestamps present in the recorded messages.

The simulator can be configured prior to the testing of the control unit, wherein it is specified in the configuration (e.g., in a database to which the simulation model has access during the simulation) which messages from the input side (in this case the second network) should be forwarded to the output side (in this case the first network), i.e., the control unit under test. In addition, it is possible to specify in the configuration for which messages the playback of recorded messages should occur. The identifier is done on the basis of the socket information (via which IP ports is the message sent) and, if applicable, the information about the header of the message, i.e., the corresponding Protocol Data Unit (PDU), if the PDU has a header. Preferably, the messages are provided with an index for each PDU as identifier. For each message (PDU) configured for forwarding, a dedicated message buffer is then created at the initiation phase of the simulation model, which is set up to receive a certain number of PDUs with the appropriate identifier, such as four.

The playback of recorded messages during the runtime of the simulation can be activated (start playback) and deactivated (stop playback), especially for individual selected messages. Thus, it is possible to toggle between the forwarding of recorded messages and the forwarding of messages from the further control units.

The simulation model can have a residual bus simulation, wherein messages from further control units are simulated in the residual bus simulation and wherein these simulated messages are written directly into a dispatch buffer for transmission to the control unit under test or wherein simulated messages with a specific identifier are written to the dedicated message buffer for messages with the appropriate identifier.

Such a residual bus simulation is typically carried out on a HIL or SIL simulator, e.g., when control units from the network of the control unit under test are not real or are not yet available as a virtual control unit, yet their communication is required for the test. The advantage here is that the residual bus simulation can be combined with the playback of recorded messages, thus allowing for messages that are not included in the recordings to be supplemented. It is also possible to replace messages which are received from the second or third network with messages from the residual bus simulation by overwriting the messages from the further control units or from the playback unit in the message buffer or only in the dispatch buffer. The dispatch buffer here refers to the buffer memory that belongs to the first interface. The residual bus simulation is preferably executed in the first network, so that the messages generated there can be written directly to the dispatch buffer.

The simulator can be set up via the playback code to provide messages with meta information before they are added to the queue, wherein the meta information provides information as to whether the message is a recorded message from the playback unit.

This meta information makes it possible to distinguish messages in the queue according to whether they come from the playback unit or from one of the connected further control units. Preferably, the incoming messages from the further control units are provided with meta information indicating that these messages do not originate from the playback unit.

From the start of the playback of the recorded messages, when messages are transmitted from the queue to the message buffer, the meta information of the messages can be queried and, in accordance with the meta information on the messages in the queue, those messages sent by the first further control unit and/or the second further control unit are discarded. Recorded messages from the playback unit are added to the queue, written to the message buffer and transmitted to the control unit under test in accordance with the timing of the simulation model.

Through this mechanism, the test of the control unit can be extended. The test setup of an HIL test with the connected further control units on a simulator makes it possible to test their interaction with the real hardware of the control units. With such a laboratory setup, however, it is not possible to simulate arbitrary test drives. Via the inventive method, complex driving maneuvers can be recorded.

The transmission of messages from the second network to the first network can take place either by parsing the messages in the second network and then forwarding the parameters to the first network via a suitable program, or by storing the messages in a common memory area, in particular in the message buffer, wherein the message buffer can be accessed both from the first network and from the second network and/or the third network. The latter option minimizes resource consumption since copying of the parameters is avoided.

The above-mentioned software modules of the simulation model simulate real control units insofar as they simulate the communication components of a control unit, in particular, service messages or messages for signal transmission. For example, a request message is accepted by one of the further control units in the second network and a corresponding response message is created and sent via the first software module, which simulates the control unit under test. In this case, the request message is forwarded to the control unit under test by transmitting via the message buffer or by parsing to the first network, and from there via the first control unit interface to the control unit under test. Accordingly, the response message from the control unit under test is forwarded to the corresponding further control unit. Other messages are event-driven. If a corresponding event occurs, e.g., in the simulation of the simulation model, corresponding messages are generated by the software modules and sent by the simulator.

In an example, recorded messages, which are service messages for service-based communication and are response messages, can be stored in the message buffer until a corresponding request message is received from the control unit under test. In this case, the header of the response message for the transmission to the control unit under test is manipulated in such a way that it is accepted by the control unit under test.

For example, the timestamp, message authentication code (MAC), and/or a counter value can be adjusted accordingly. Thus, a message that would not actually be accepted by the control unit under test, because, for example, the counter value and a value to be generated with the current counter value are not up-to-date, are manipulated in such a way that they are accepted by the control unit under test due to the knowledge of the current counter value in the simulator and corresponding encryption algorithms.

Preferably, when each recorded message is received, the playback unit can check in the simulator whether it is a Service Discovery message, and if it is a Service Discovery message, the reception status of the message can be checked for the corresponding service.

If several control units are connected to the communication both to the first network and the second network (i.e., in the event that at least one further control unit is connected to the network of the control unit under test), it is advantageous to extend the configuration of the simulator in such a way that messages, for example, that are to be transmitted from a control unit connected to the second network to several control units on the first network, are only forwarded via a simulated control unit, i.e., messages sent from the first further control unit to more than one control unit simulated by a software module are only forwarded by a dedicated software module, i.e., they are written only to the dedicated message buffer for the messages of this simulated control unit in order to avoid duplicate transmission of the same messages. If the simulated control unit intended for forwarding is logged out of the service in the recorded messages, forwarding to the further control units in the first network can no longer take place. By checking the reception status for the service, a timely configuration can be made to a control unit that is active.

The header of each received recorded message can be checked and if there is a timestamp, this recorded message is not played until the simulation time in the simulator is greater or equal to the time given by the timestamp or, alternatively, the recorded message is not played until the difference from the timestamp of a previously received recorded message is greater than or equal to the time that has elapsed since the previously received recorded message was played.

This ensures that the recorded messages are played back at the correct time interval from each other.

The playback unit can be connected to the third network via the playback interface, and the first further control unit and/or the second further control unit can be connected to the second network via the further control unit interface. This enables a clean separation of further control units and playback unit and also a simple switching between the reception of recorded messages and the reception of up-to-date messages from a real or virtual control unit.

The object is also achieved by a simulator which is set up to carry out the method of the invention.

Further scope of applicability of the present invention will become apparent from the detailed description given hereinafter. However, it should be understood that the detailed description and specific examples, while indicating preferred embodiments of the invention, are given by way of illustration only, since various changes, configurations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
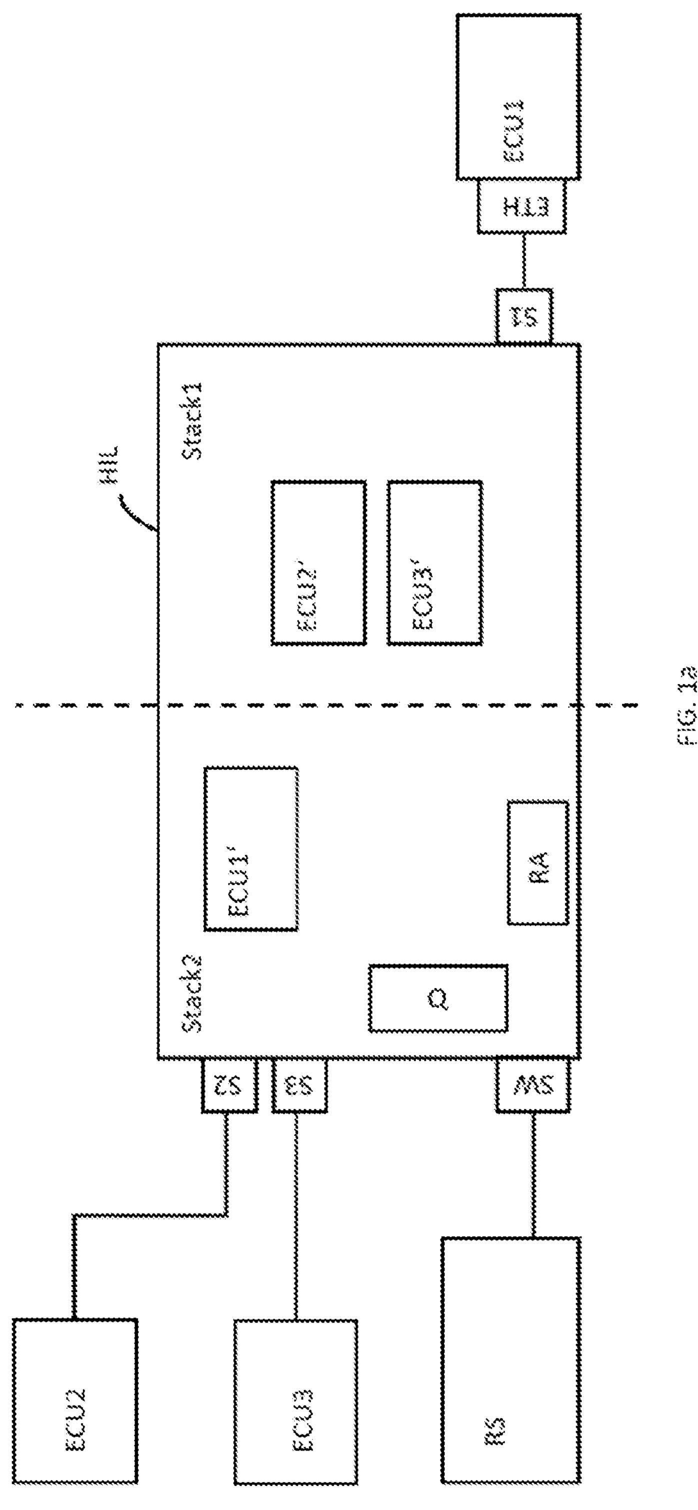
FIG. 1*a* shows a schematic representation of the simulator according to the invention for carrying out the method of testing a control unit via an HIL system.

FIG. 1*a* shows an inventive simulator HIL on which a first network Stack1 (output side) and a second network Stack2 (input side) are provided. The control unit under test ECU1 is connected to the simulator HIL via the first control unit interface S1 of the simulator HIL and its Ethernet interface ETH. On the input side, a first further control unit ECU2 and a second further control unit ECU3 are connected via the further control unit interfaces S2, S3 of the simulator HIL to the second network Stack2 (the Ethernet interfaces on the further control units ECU2 and ECU3 are not shown here). Furthermore, a playback unit RS is connected to the second network Stack2 via the playback interface SW. The communicative interaction between the control units, which are actually connected in a real system in a control unit network, will be tested. For test purposes, however, the simulator HIL is interposed in order to be able to manipulate messages from the further control units ECU2, ECU3. In order to fool the real control units into believing that they are communicating directly with their intended communication partners, these are simulated in the respective network for the communication partners connected there, i.e., all messages and reactions (response messages, acknowledgments of receipt, etc.) expected by the counterpart are created in the simulation or taken from the other network and sent to the real connected control units. The control unit under test ECU1 is simulated via the first software module ECU1', in the second network Stack2, the further control units ECU2, ECU3 are simulated in the first network Stack1 via the further software modules ECU2', ECU1'.

All messages that are received via the further control unit interfaces S2, S3 are added to a queue Q, a receive queue, so to speak. From this queue Q, those messages for which it has been configured that they are to be forwarded to the control unit under test are written to a message buffer (not shown) which can be accessed from both the first network Stack1 and the second network Stack2.

The playback unit RS contains recorded messages, for example from the recording of the message traffic during a test drive in a car in which corresponding control units ECU1, ECU2, ECU3 are installed. In order to be able to insert messages from such a test drive into the simulation of the test, a playback code RA is available in the second network Stack2, which controls the playback of the recorded messages. The start time of playback is determined in the configuration or by a command from a user, e.g., by an entry via a graphical user interface (GUI). From this start time, the messages received on the simulator HIL via the playback interface SW are added to the queue Q. In the simulator HIL, the recorded messages are provided with meta information so that they are identified as messages from the playback unit RS. From the start time of playback, only the messages from the queue Q are written to the message buffer which are to be forwarded to the first network Stack1, which, according to the meta information, come from the playback unit RS, whereas the messages received by the real connected control units during this time are discarded from the queue Q. In the first network Stack1, the data required for the messages expected by the control unit under test ECU1 are taken from the message buffer, packaged as suitable messages, i.e., manipulated if necessary, and sent via the first control unit interface S1 to the control unit under test ECU1.

Figure 1B:
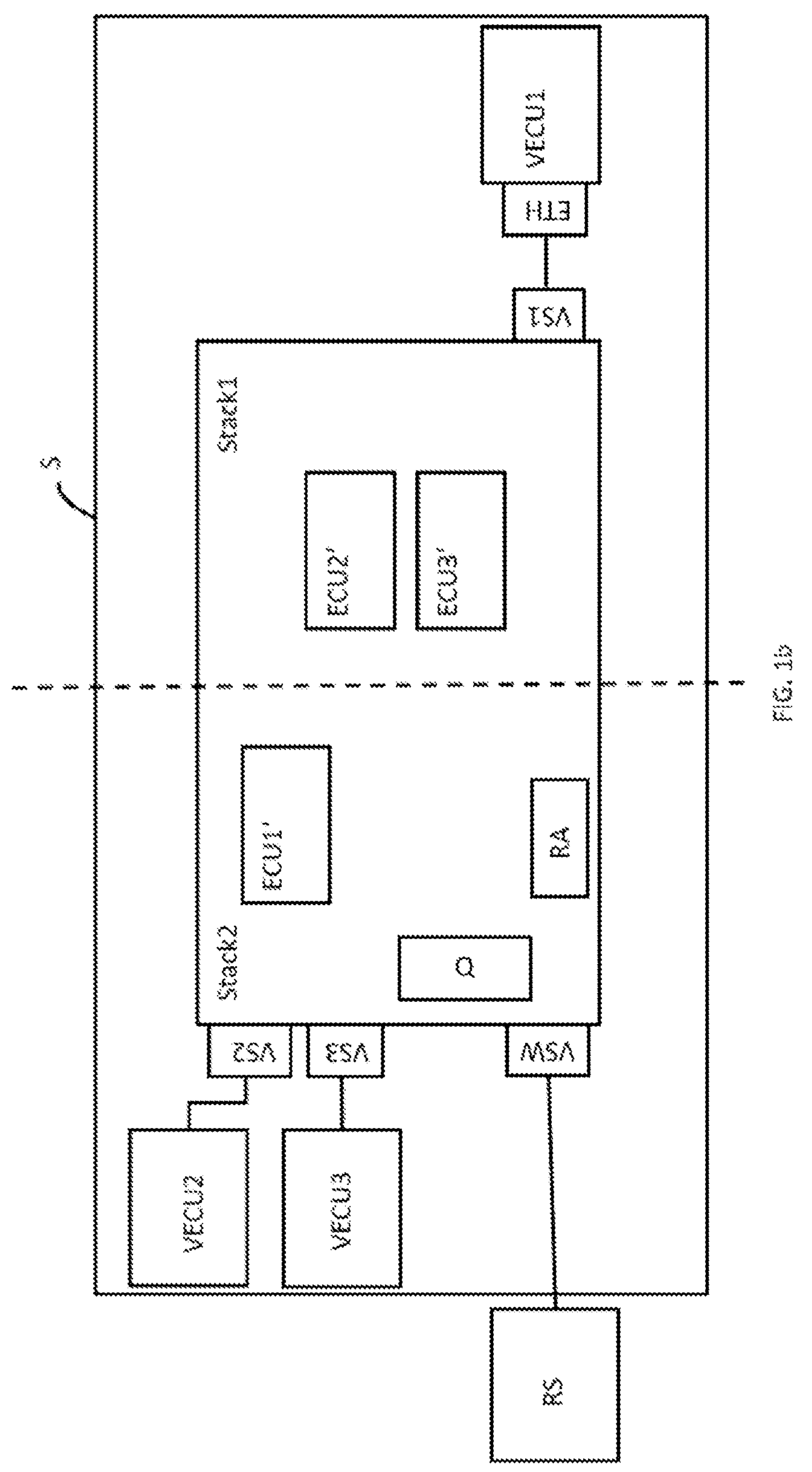
FIG. 1*b* shows a schematic representation of the simulator according to the invention for carrying out the method for testing a control unit via an SIL system.

FIG. 1*b* shows the analog test setup for an SIL simulator S. The simulator can be implemented on a PC or in a PC cluster or in a cloud. Here, testing is conducted with virtual control units VECU1, VECU2, VECU3 instead of real ones. All virtual control units VECU1, VECU2, VECU3 are run in the simulator, i.e., on a suitable simulation platform. Here, too, there are two separate networks Stack1, Stack2 so as to be able to manipulate the communication between the virtual control units VECU1, VECU2, VECU3. The virtual control units VECU1, VECU2, VECU3 are connected via virtual interfaces VETH, VS1, VS2, VS3 as communication participants of the respective network Stack1, Stack2, namely via virtual buses, which simulate the behavior (timing, triggering of messages, etc.) of real buses. In the simulation of communication, the participants who do not exist as virtual control units in the respective network are replaced by software modules ECU1', ECU2' and ECU3', which send the messages that are expected or to be received to the virtual control units VECU1, VECU2, VEUC3 in their respective network Stack1, Stack2.

The playback unit RS is given in FIG. 1*b* by a software program for the playback of recorded messages and connected to the simulator via a software interface VSW and integrated in the simulation. For example, the software program can be used as another program on the PC, in the PC cluster or in the cloud, where the simulator is also available. The integration of the playback of recorded messages is carried out in the same way as described in FIG. 1*a*.

Furthermore, it is also possible to simulate virtual control units VECU1, VECU2, VECU 3 on an HIL simulator HIL, for example if the control unit under test ECU1 is already available in real life, but not all communication partners ECU2, ECU3 have yet been physically implemented. The first further control unit ECU2 could then be connected real to the simulator HIL, but a second further control unit ECU3 can be emulated in the HIL simulator HIL as a virtual control unit VECU3.

Another hybrid scenario would be that the control unit under test ECU1 is connected to a real-time capable PC on which the further communication partners are simulated as virtual control units VECU2, VECU2 in a simulator S. It is also possible to test a virtual control unit VECU1 with real communication partners ECU2, ECU3.

Figure 2:
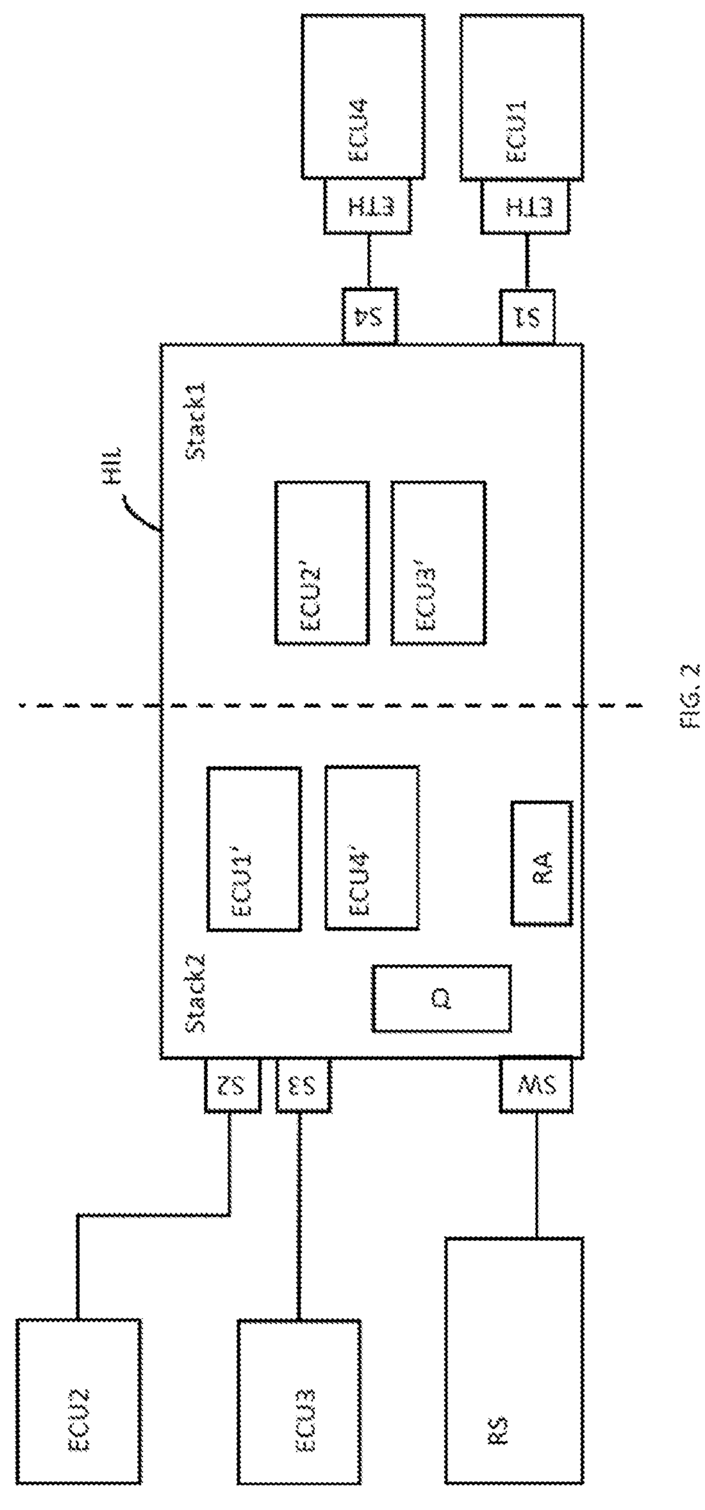
FIG. 2 shows a schematic representation of the simulator according to the invention for carrying out the method for testing one or more control units.

FIG. 2 shows an extension of the situation in FIG. 1*a*, which can also be used in the test setup for a simulator SIL in FIG. 1*b*. Here, a further control unit ECU4 is also connected in the second network Stack1. If the control units ECU1, ECU4 connected to the first network Stack1 have now both subscribed to a service with the first further control unit ECU2, it is advantageous, in the simulation in the second network Stack2 (software modules ECU1' and ECU4'), to forward the messages from this service to the first network Stack1 only once and only via a dedicated message buffer to avoid message duplication. For example, messages that are to be sent to ECU4' are also written to ECU1' in the dedicated message buffer for the messages of this service.

For the playback of recorded messages, in this case the recorded messages are checked to see if the control unit ECU1 on which the message forwarding for this service is carried out has logged out of the service during recording. If this is the case, the configuration is changed in such a way that the forwarding still takes place.

Figure 3:
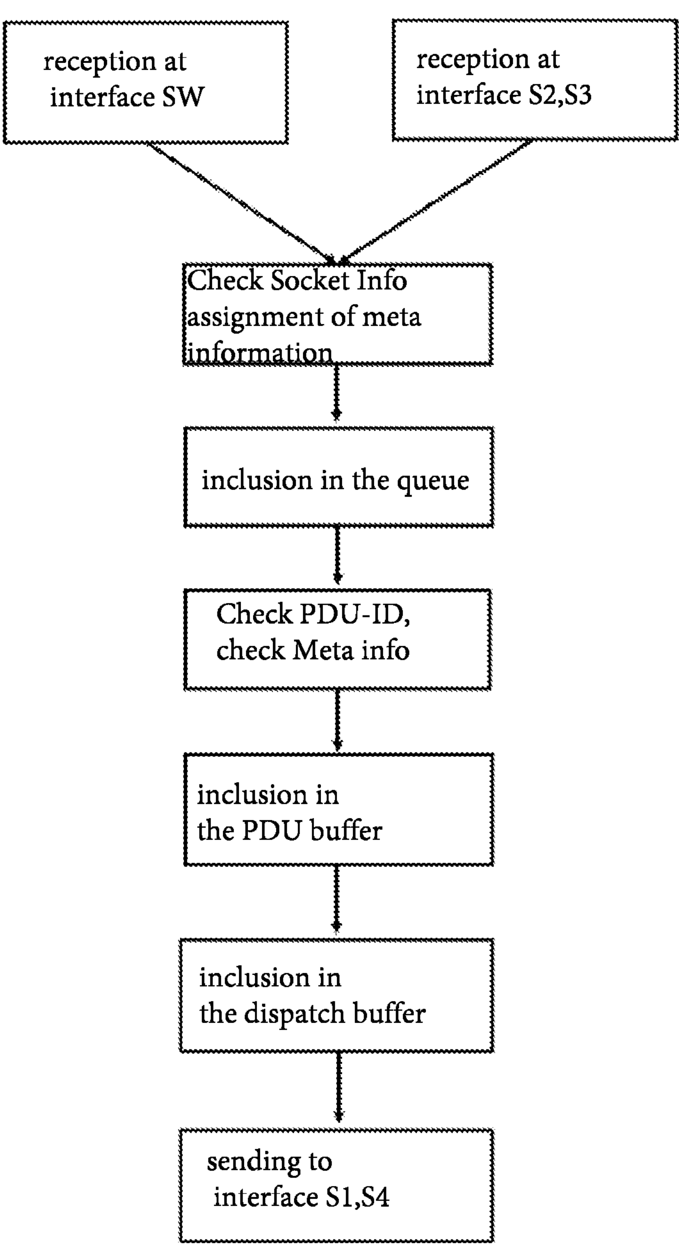
FIG. 3 shows a flowchart showing the process of the method according to the invention.

FIG. 3 shows a flow diagram of the course of the inventive method. Shown is the path of the messages when they are forwarded from the second network Stack2 to the first network Stack1. The messages of the further control units ECU2, ECU3 are received at one of the interfaces S2, S3. The recorded messages from the playback unit RS are received at the playback interface SW. Upon receipt at the interfaces S2, S3, SW, the socket information of the messages is first checked and on the basis of this information and any further information about the corresponding PDU, an identifier PDU-ID is assigned. In addition, a timestamp is assigned and a meta information is attached to the messages, which shows whether the messages originate from the playback unit RS. Subsequently, the incoming messages are added to the queue Q, regardless at which of the mentioned interfaces the messages were received. From the queue Q, messages are written to a dedicated message buffer PDU-buffer for forwarding to the first network Stack1. To this end, the message identifier PDU-ID is first checked. If the message identifier PDU-ID is provided for forwarding in the configuration of the simulation, a corresponding dedicated message buffer is provided. If the playback mode is active, only recorded messages from the playback interface SW are written to the message buffer, the messages of the further control units ECU2, ECU3 are discarded. Otherwise, the simulator HIL can be set up to include only the messages from the further control units ECU2, ECU3 in the message buffer. The simulation model, while running on the simulator, triggers the message to be sent to the control unit under test ECU1 by including the messages from the message buffer in the sending buffer for the first control unit interface S1 in response to a corresponding trigger command.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for testing at least one control unit, wherein at least two separate networks are available on a simulator, the control unit under test is connected to the simulator via a first network and a first control unit interface or is emulated in the simulator as a participant of the first network, the control unit under test is intended to communicate with at least one first further control unit, a communication of the first further control unit is at least partly in a form of a recorded message, wherein via at least one playback interface, a playback unit for playing the recorded messages is connected to a second network or a third network on the simulator, a queue being stored on the simulator for messages received in the second and/or third network, the method comprising:

simulating at least parts of the communication of the control unit under test with at least the first further control unit via a simulation model stored on the simulator, wherein in the second network, via a first software module of the simulation model, at least parts of the communication of the control unit under test are simulated and, on the simulator in the first network, the further control units communicating with the control unit under test are simulated as communication partners for the control unit under test via at least one further software module of the simulation model; and controlling a playback of the messages recorded and transmitted to the simulator via a playback code stored on the simulator, wherein a command for starting the playback causes the recorded messages that the simulator receives from the playback unit to be added to the queue and from there written to a message buffer in order to be forwarded from the simulation model to the control unit under test on a trigger command.

2. The method according to claim 1, wherein at least one further control unit interface is provided on the simulator or in the simulator with which the first further control unit and/or a second further control unit is connected to the second network, wherein in the second network, via the first software module of the simulation model, the control unit under test is simulated as a communication partner for at least the first further control unit, wherein via the further control unit interfaces, incoming messages from the first and/or the second further control unit are added to the queue and from there written to the message buffer.

3. The method according to claim 1, wherein messages have an identifier, wherein the message buffer on the simulator is set up in such a way that a dedicated message buffer is provided for at least one predetermined message identifier, and wherein each of the dedicated message buffers is set up to receive a specified number of messages with the appropriate identifier.

4. The method according to claim 3, wherein the simulation model comprises a residual bus simulation, wherein messages are simulated in the residual bus simulation and wherein these simulated messages are written directly to a dispatch buffer for transmission to the control unit under test or wherein simulated messages with a specific identifier are written to the message buffer dedicated to messages with the appropriate identifier.

5. The method according to claim 1, wherein the simulator is set up to provide messages with meta information before they are added to the queue, wherein the meta information indicates whether the message is a recorded message from the playback unit.

6. The method according to claim 1, wherein from the start of the playback of the recorded messages, when messages are transmitted from the queue to the message buffer, the meta information of the messages is queried and, according to the meta information on the messages in the queue, those messages sent from the first further control unit and/or the second further control unit are discarded and only the recorded messages from the playback unit are written to the message buffer and forwarded to the control unit under test.

7. The method according to claim 1, wherein transmission of the messages from the second network to the first network takes place either by parsing the messages in the second network and then forwarding parameters via a suitable program or by placing the messages in a common memory area, in particular in the message buffer, wherein the message buffer are adapted to be accessed from both the first network and the second network and/or the third network.

8. The method according to claim 1, wherein the software modules simulate real control units in that they simulate the communication components of a control unit or service messages or messages for signal transmission.

9. The method according to claim 1, wherein recorded messages, which are service messages, namely response messages, are stored until a corresponding request message is received from the control unit under test, and wherein a header of the response message for transmission to the control unit under test is manipulated such that it is accepted by the control unit under test.

10. The method according to claim 1, wherein in the simulator, each recorded message received from the playback unit is checked whether it is a service discovery message, and if it is a service discovery message, the reception status of the message for the corresponding service is checked.

11. The method according to claim 1, wherein a header of each received recorded message is checked and wherein, if a timestamp is available, the recorded message is not played until the simulation time in the simulator is greater than or equal to the time given by the timestamp, or the recorded message is not played until the difference from the timestamp of a previously received recorded message is greater than or equal to the time that has elapsed since the playback of the previously received recorded message.

12. The method according to claim 1, wherein the playback unit is connected to the third network via the playback interface and the first further control unit and/or the second further control unit are connected to the second network via the further control unit interface.

13. A simulator configured to perform the method according to claim 1.

* * * * *